(12) United States Patent
Petter et al.

(10) Patent No.: US 6,802,444 B1
(45) Date of Patent: Oct. 12, 2004

(54) HEAT TREATMENT OF FRICTION STIR WELDED 7X50 ALUMINUM

(75) Inventors: George E. Petter, Houston, TX (US); John D. Figert, Friendswood, TX (US); Daniel J. Rybicki, Houston, TX (US); Timothy H. Burns, Sugar Land, TX (US)

(73) Assignee: The United States of America as represented by the National Aeronautics and Space Administration, Washington, DC (US)

( * ) Notice: Subject to any disclaimer, the term of this patent is extended or adjusted under 35 U.S.C. 154(b) by 71 days.

(21) Appl. No.: 10/390,678

(22) Filed: Mar. 17, 2003

(51) Int. Cl.$^7$ .............................. B23K 20/12; C22F 1/04
(52) U.S. Cl. ..................... 228/112.1; 228/2.1; 228/200; 148/516; 148/690
(58) Field of Search ............................... 228/112.1, 2.1, 228/200; 148/516, 535, 549, 688, 690

(56) References Cited

U.S. PATENT DOCUMENTS

| | | |
|---|---|---|
| 3,881,966 A | 5/1975 | Staley et al. |
| 3,947,297 A | 3/1976 | Reimann et al. |
| 4,426,429 A | 1/1984 | Russo et al. |
| 4,431,467 A | 2/1984 | Staley et al. |
| RE34,008 E | 7/1992 | Quist et al. |
| 5,221,377 A | 6/1993 | Hunt, Jr. et al. |
| 5,277,719 A | 1/1994 | Kuhlman et al. |
| 5,810,949 A | 9/1998 | Chakrabarti et al. |
| 6,168,067 B1 | 1/2001 | Waldron et al. |
| 6,398,883 B1 | 6/2002 | Forrest et al. |
| 6,638,381 B2 * | 10/2003 | Keener et al. .............. 148/669 |
| 6,726,085 B2 * | 4/2004 | Litwinski et al. ......... 228/112.1 |
| 2002/0121319 A1 * | 9/2002 | Chakrabarti et al. ........ 148/694 |
| 2002/0125297 A1 * | 9/2002 | Stol et al. ................ 228/112.1 |
| 2003/0072671 A1 * | 4/2003 | Kuehmann et al. ........... 420/38 |
| 2003/0087122 A1 * | 5/2003 | Benedictus et al. ......... 428/654 |
| 2003/0111147 A1 * | 6/2003 | Keener et al. .............. 148/671 |
| 2003/0116608 A1 * | 6/2003 | Litwinski ................. 228/112.1 |
| 2003/0116609 A1 * | 6/2003 | Dracup et al. ........... 228/112.1 |
| 2003/0218052 A2 * | 11/2003 | Litwinski ................. 228/112.1 |
| 2003/0226625 A1 * | 12/2003 | Kuehmann et al. ......... 148/621 |
| 2003/0226935 A1 * | 12/2003 | Garratt et al. .............. 244/123 |
| 2004/0000576 A1 * | 1/2004 | Litwinski ................. 228/112.1 |
| 2004/0004107 A1 * | 1/2004 | Litwinski .................. 228/56.3 |
| 2004/0050907 A1 * | 3/2004 | Dracup et al. ........... 228/112.1 |
| 2004/0056075 A1 * | 3/2004 | Gheorghe ................... 228/199 |

* cited by examiner

Primary Examiner—Kiley Stoner
(74) Attorney, Agent, or Firm—Theodore U. Ro

(57) ABSTRACT

A method for treating alloy before and after friction stir welding, the method comprising the following steps. First solution heat treating a multiplicity of aluminum-zinc alloy engineered components for a first time period at a first temperature. First air cooling the components in ambient air at room temperature until the components are cooled to room temperature. Friction stir welding the components to form an assembly. Second solution heat treating the assembly for a second time period at a second temperature. Additional steps and embodiments are considered.

28 Claims, 4 Drawing Sheets

HEAT TREATMENT OF FRICTION STIR WELDED 7X50 ALUMINUM

ORIGIN OF THE APPARATUS

The methods described herein were made by employee(s) under contract with the United States Government and may be manufactured and used by or for the Government of the United States of America for governmental purposes without the payment of any royalties thereon or therefor.

BACKGROUND OF INVENTION

Aluminum alloys are used in a variety of applications. For example, certain aluminum alloys are extensively employed in lightweight structures, such as are present in subsonic aircraft systems, because of their high strength to weight ratio, low cost and good formability. These high strength alloys, designated in the art as 7000 series aluminum alloys, contain as their principal components a major amount of aluminum and minor amounts of zinc.

Friction stir welding is utilized to join engineered components (hereinafter referred to as "component [singular] or components [plural]") to form assemblies that may be used in the manufacture of aerospace, aeronautical, military and commercial applications. As illustrated in FIG. 1, friction stir welding involves inserting a rotating friction stir welding probe 10 (hereinafter referred to as "probe") into a multiplicity of faces of faying components, while urging the components together. The rotation of the probe 10 between the faying faces of the components creates friction that generates sufficient heat energy to plasticize the components' material in the weld zone 14. A weld joint forms 13, joining the components together in a unitary assembly 15, as the plasticized regions of the components flow together and solidify in the weld zone. Alternatively, a plasticized region between the components can be formed without utilizing a rotating tool by moving one of the components relative to the other while concurrently urging the components together.

Although the development of friction stir welding technology to make complex welds is proceeding at an extremely rapid pace, understanding of the microstructural transformations that occur during the friction stir welding process and of the post weld mechanical properties has been relatively slow. Where 7X50 (wherein "X" can represent any number from 0–9, see block 31 of FIG. 5) series aluminum (Al) alloy components are friction stir welded, solution heat treating the components is necessary to improve corrosion resistance (including stress corrosion cracking [SCC] resistance), ductility as well as tensile and yield strengths. Solution heat treatment for the purposes herein is defined as heating an alloy to a suitable temperature and holding the alloy at that temperature long enough to cause one or more constituents to enter into a solid solution. Post-friction stir welded heat treatment of 7X50 aluminum alloy components in accordance with SAE AMS-H 6088, a standard heat treat specification with temperature schedules commonly known in the art, results in large columnar grains in the weld metal of a friction stir welded joint. Further, elongation is below 2% and standard 3-point bend specimens fracture in a brittle manner. A fracture of this nature, as is known in the art, is considered to be unacceptable. The standard practice uses specific temperature schedules in an effort to mitigate SCC problems on 7X50 series aluminum alloys that have not been welded or otherwise thermally processed. Most research is currently attempting to use low temperature heat treatments for shorter time periods to eliminate SCC concerns as well as elimination of a heat treatment step altogether. Further, an advantage of the low temperature heat treatment has a less likelihood to distort a component. The term low temperature as used herein is defined as less than about 400 degrees F. Conversely, the term high temperature for the purposes herein is defined as greater than about 410 degrees F.

Various types of low temperature schedules in efforts to mitigate material degradation after a friction stir weld process have been attempted. However, material degradation such as SCC may still exist. The present method uses high temperature heat treatment in contrast to the current research trend.

Thus, there is a need for improved methods of heat treating friction stir welding materials. Such manufacturing methods should be cost effective, as well as minimizing the degradation of the material properties.

DETAILED DESCRIPTION

The present method will now be described more fully hereinafter with reference to the accompanying drawings, in which embodiments of the method are shown. This method may, however, be embodied in many different forms and should not be construed as limited to the embodiments set forth herein; rather, these embodiments are provided so that this disclosure will be thorough and complete and will fully convey the scope of the method to those skilled in the art. Like numbers refer to like elements throughout.

The term "about" as used herein may be applied to modify any quantitative representation that could permissibly vary without resulting in a change in the basic function to which it is related. For example, a quantitative temperature as disclosed herein may permissibly be different than the precise value if the basic function to which the temperature is related does not change.

Figure 1:
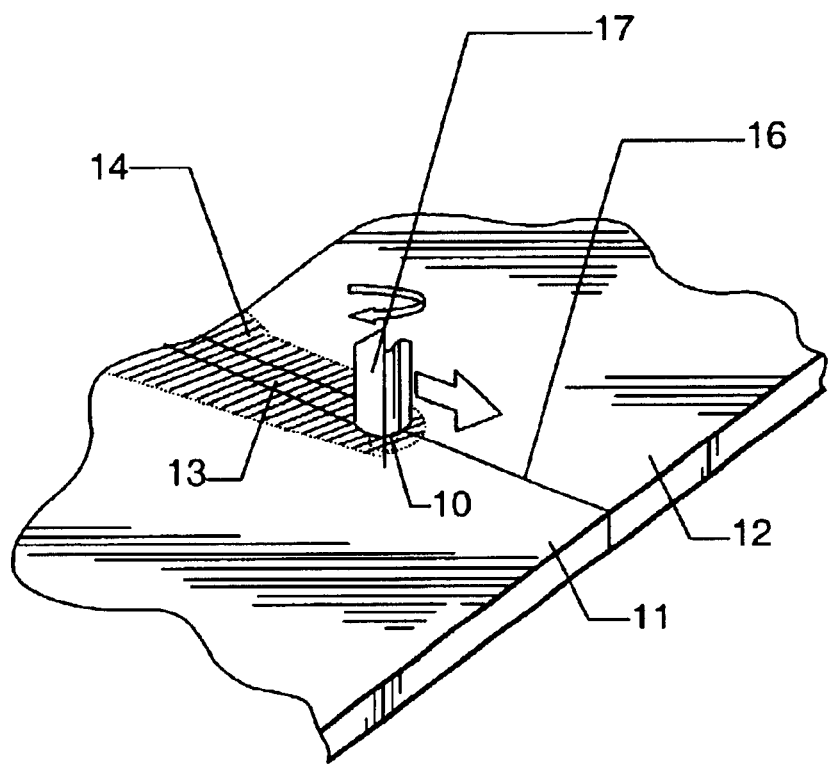
FIG. 1. is a fragmentary perspective view illustrating the joining of two components through friction stir welding, as is known in the art.
Figure 2:
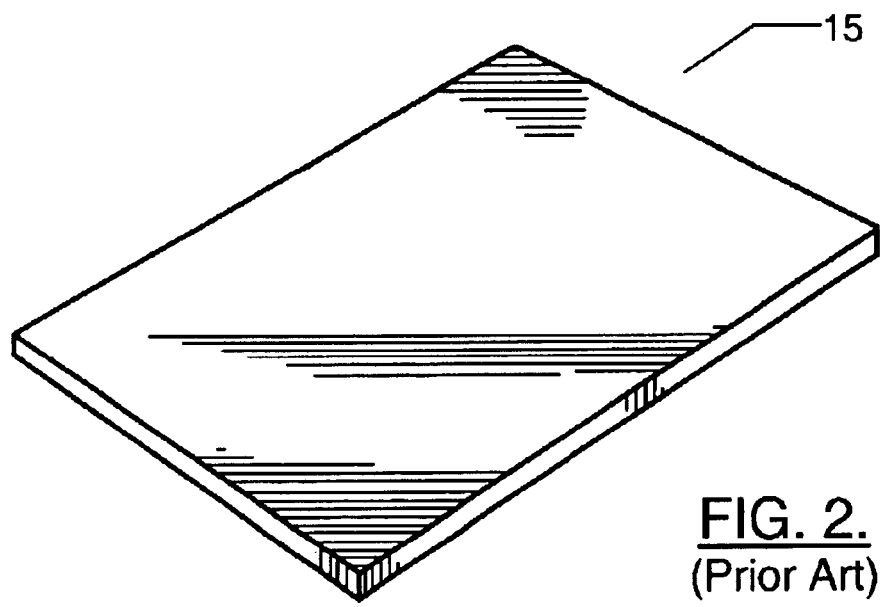
FIG. 2. is a fragmentary perspective view illustrating an assembly fabricated by the joining of two components through friction stir welding, as is known in the art.
Figure 3:
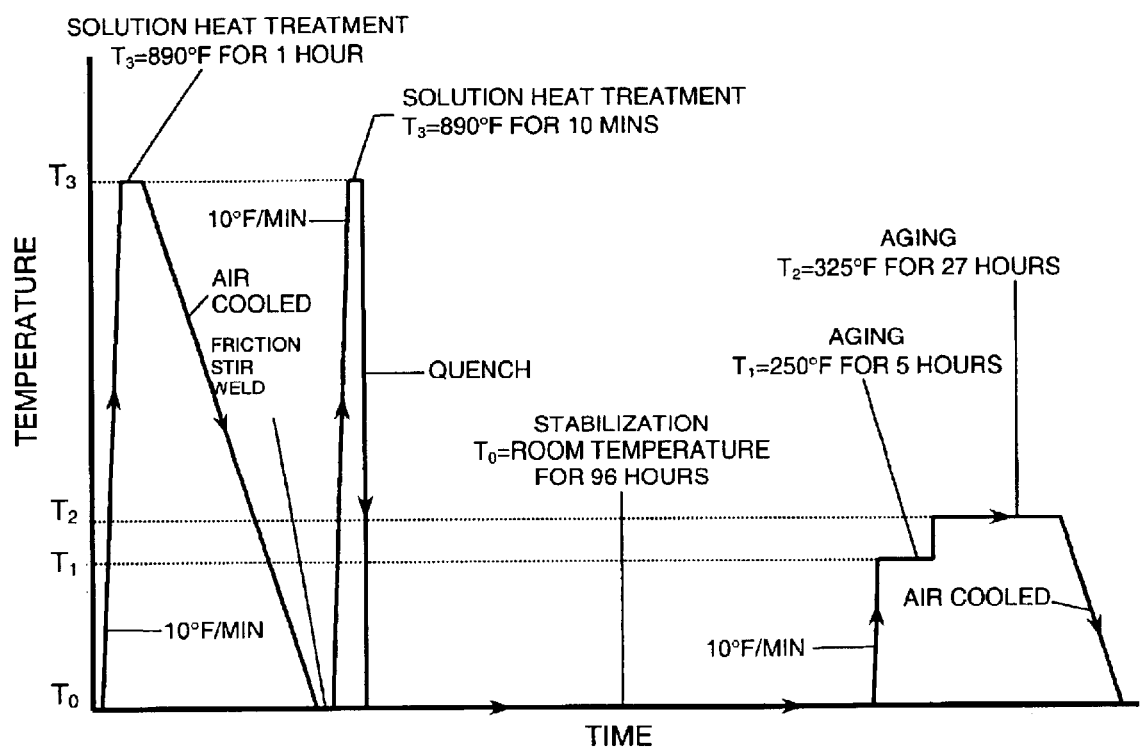
FIG. 3. is a schematic temperature-versus-time plot illustrating an example cycle for a 0.27 inch 7050 Al plate that incorporates a friction stir weld step.
Figure 5:
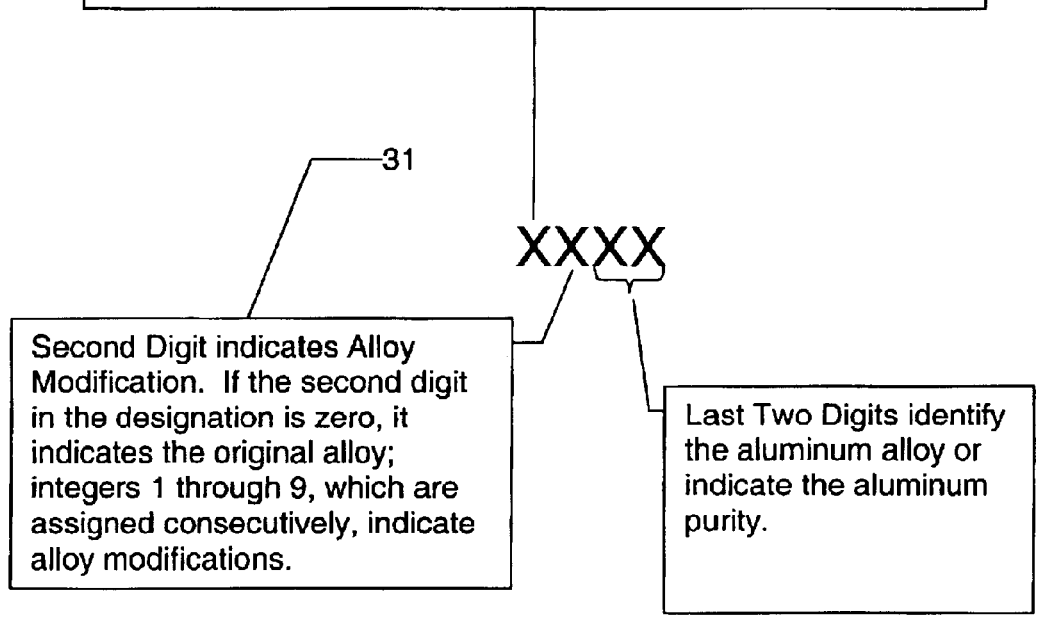
FIG. 5 is a key chart illustrating the definition of each number in an Al alloy four digit code, as is known in the art.

Referring now to the drawings, and in particular to FIG. 1, there is shown a first component 11 and second component 12, undergoing a friction stir weld. In one embodiment, the first and second components are made of 7X50 Al alloy. In a further embodiment, both the first and second components are made of 7050 Al alloy. In one embodiment, the first and second components have a thickness from about 0.25 inches to about 0.50 inches. For a definition of each number in the XXXX sequence describing an Al alloy, refer to FIG. 5. The first and second components may be machined, through known manufacturing means, from a single workpiece into a predetermined shape and thickness as required by the specific design loads and specifications of the resulting assembly 15. The assembly 15 as illustrated in FIG. 2 is the result of friction stir welding the first and second components 11, 12, respectively.

A multiplicity of components may be utilized in this manner. For example, the resulting assembly 15 may be used in a further friction stir welding process with a third component (not shown) to form a second assembly (not shown) and so on and so forth.

Figure 4:
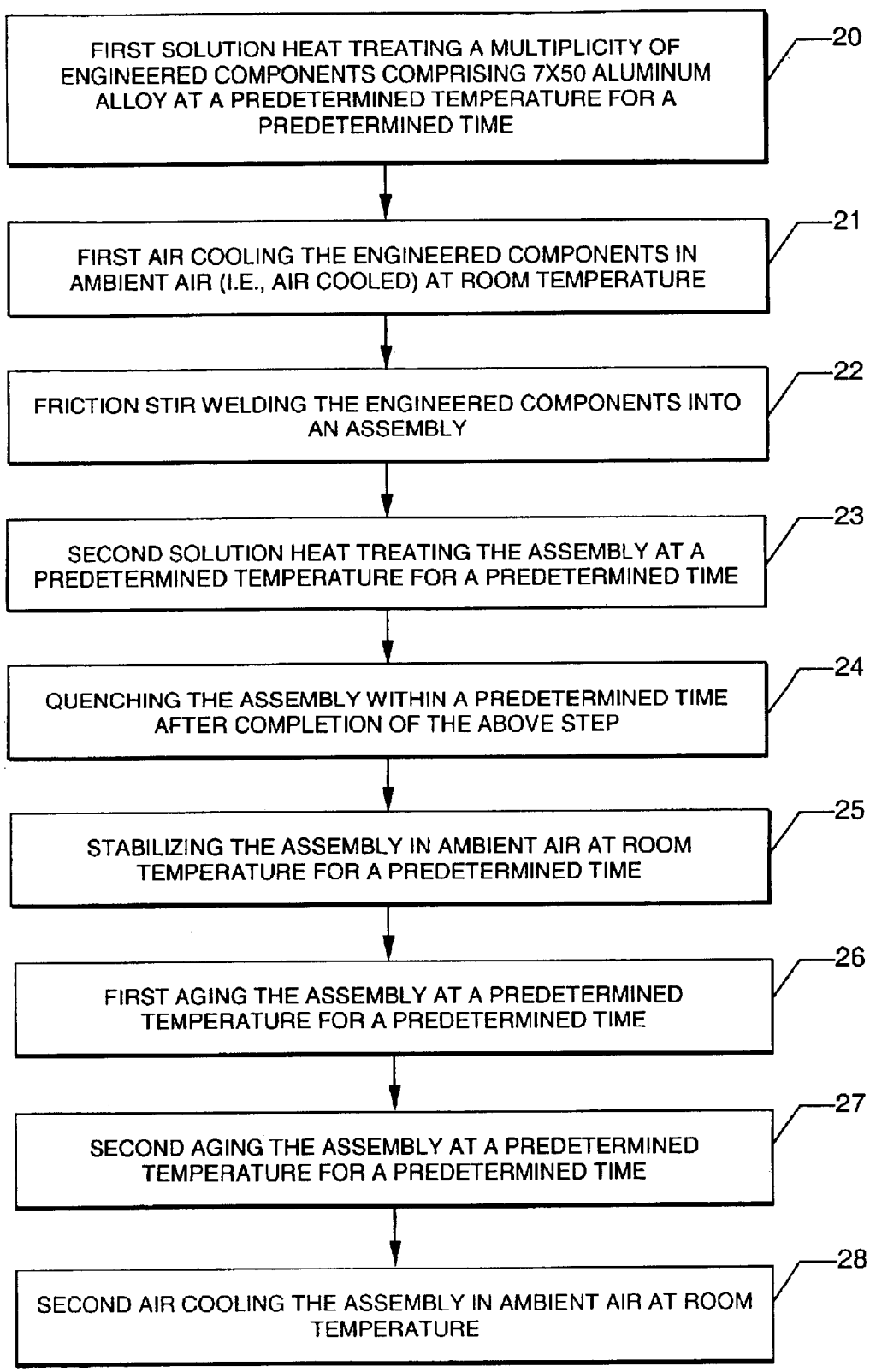
FIG. 4. is a flow chart showing the general steps performed of the present method to pre-treat and post-treat a multiplicity of components and the friction stir welded assembly, respectively.

To prepare a multiplicity of components, these components may be pre-conditioned prior to joining the components by the welding process. With continued reference to FIG. 1, a friction stir welding process joins materials by plasticizing and then consolidating the material around an interface line 16. Pre-conditioning a metal alloy before the friction stir weld changes the mechanical properties of the metal alloy by the formation of uniformly dispersed particles. Specifically, the strength and hardness of the alloy are significantly reduced. Referring to FIG. 4, pre-conditioning, for the purposes herein, is defined as comprising a first solution heat treating step (see block 20 in FIG. 4) and a cooling step in ambient air (see block 21 in FIG. 4).

In one embodiment, the first solution heat treating step comprises heating a multiplicity of 7X50 Al alloy components at a first temperature. In a further embodiment, the first solution heat treating step comprises heating a multiplicity of 7050 Al alloy components at a first temperature. In one embodiment, the first temperature is greater than 410 degrees F. In a further embodiment, the first temperature is from about 880 degrees F. to about 900 degrees F. In a further embodiment, the first temperature is about 890 degrees F. In one embodiment, the thickness of the multiplicity of 7X50 Al or 7050 Al alloy components is from about 0.25 inches to about 0.50 inches. In a further embodiment, the thickness of the multiplicity of 7X50 Al or 7050 Al alloy components is about 0.25 inches. In a further embodiment, the thickness of the multiplicity of 7X50 Al or 7050 Al alloy components is about 0.27 inches. In one embodiment, the heating time or first time period is from about 60 minutes to about 90 minutes. In a further embodiment, the first time period is about 60 minutes.

In one embodiment, the first air cooling step comprises cooling the multiplicity of 7X50 Al or 7050 Al alloy components in ambient air (i.e., air cooled) to room temperature. In one embodiment, the first air cooling step occurs at room temperature. This specific cooling step is not a standard SAE-AMS-H-6088 anneal or a standard solution heat treatment including a liquid quench.

As an example as illustrated in FIG. 1, the first and second components 11, 12, both of which may have been pre-conditioned by a first solution heat treating step and cooling step are ready to be joined by friction stir welding to form an assembly 15. Friction stir welding eliminates a number of defects and other undesirable properties related to conventional fusion welding, such as micro-cracks, poor ductility, lack of fusion, porosity and most importantly, minimization of distortion, which can adversely effect the shape and tolerances of the joined components. As is known in the art, 7X50 and most other 7000 series Al alloys are considered unweldable by conventional fusion processes. To join components by friction stir welding, the components are positioned relative to one another such that the components define an interface 16 along the length of the components. The components may be secured so as to prevent movement of the components relative to one another. For instance, the components may be secured to each other by spot welding or using a mechanical clamp. The components may then be secured to a worktable by means of a conventional clamp (not shown).

As illustrated in FIG. 1, the first and second components 11, 12 are joined to one another by friction stir welding (see block 22 in FIG. 4) the components along the interface 16 of the components, which defines a welding path. For a general discussion of friction stir welding, see U.S. Pat. No. 5,460,317 to Thomas et al., the contents of which are incorporated herein by reference. Generally, the rotating probe 10, which is attached to a friction stir welding tool 17 is forced through the outer surfaces of the components. The frictional heat generated by the rotating probe creates a plasticized region or weld zone 14 between the components. With continued reference to FIG. 1 and reference to FIG. 2, the rotating probe 10 is then moved along the path defined by the interface between the components to thereby form a continuous friction stir weld joint 13 along the length of the components, thus forming a unitary assembly 15, albeit still having somewhat unstable material properties since the temper of the assembly 15 is incomplete.

As an example, with continued reference to FIG. 1 and reference to FIG. 2, once the first and second components 11, 12, respectively, of the assembly 15 are joined, the post friction stir welded treatment of the assembly 15 may be initiated. As stated earlier, an assembly may be the result of 'two' or 'more than two' components that have been friction stir welded. "Assembly" as hereinafter defined is at least two components that have been friction stir welded. The first step in the post friction stir welded treatment is a post-weld solution heat treatment or second solution heat treating step (see block 23 in FIG. 4). Post-weld solution heat treatment reduces material degradation of the assembly. For example, the post-weld solution heat treatment homogenizes the material affected by friction stir welding while significantly limiting large grain growth at the face and root of the weldment. A secondary benefit of post weld heat treatment is the inherent reduction or elimination of welding induced residual stresses. The second solution heat treating step comprises heating the assembly at a second temperature for a second time period. In one embodiment, the second temperature is greater than 410 degrees F. In a further embodiment, the second temperature is from about 880 degrees F. to about 900 degrees F. In a further embodiment, the second temperature is about 890 degrees F. In one embodiment, the second time period is from about 5 minutes to about 20 minutes. This second time period is not a SAE-AMS-H-6088 standard. In a further embodiment, the second time period is about 10 minutes.

The second step in the post friction stir welded treatment may involve quenching (see block 24 in FIG. 4) the assembly to prevent diffusion and the accompanying formation of any solute phase. Specifically, the quenching step comprises immersing the assembly in a water bath wherein in one embodiment, the water is at a third temperature. In one embodiment, the third temperature is from about 70 degrees F. to about 125 degrees F. In a further embodiment, the third temperature is about 85 degrees F. to about 100 degrees F. In one embodiment, the quenching step is initiated within about 10 seconds from the time the post-weld solution heat treatment is completed. A drop bottom quench furnace may be used.

The third step in the post friction stir welded treatment may involve stabilizing the assembly in ambient air at room temperature (see block 25 in FIG. 4) for a third time period. This step allows for natural aging and stabilization and is not a SAE-AMS-H-6088 standard. In one embodiment, the assembly is held for a third time period of at least about 4 hours in ambient air at room temperature. In a further embodiment, the assembly is held for a third time period of at least about 96 hours in ambient air at room temperature.

The fourth step in the post friction stir welded treatment may involve a first aging of the assembly (see block 26 in FIG. 4). This first aging step may be accomplished in a recirculating air furnace. The assembly is first aged at a fourth temperature for a fourth time period. In one embodiment, the fourth temperature is from about 240 degrees F. to about 260 degrees F. In one embodiment, fourth time period is from about 3 hours to about 6 hours. In a further embodiment, the assembly 15 is first aged at a fourth temperature of about 250 degrees F. for a fourth time period of about 5 hours.

The fifth step in the post friction stir welded treatment may involve a second aging of the assembly (see block 27 in FIG. 4). This second aging step may be accomplished in a recirculating air furnace. The assembly is second aged at a fifth temperature for a fifth time period. In one embodiment, the assembly is second aged at a fifth temperature from about 315 degrees F. to about 335 degrees F. In one embodiment, the second aging time or fifth time period is from about 24 hours to about 30 hours. In a further embodiment, the assembly 15 is second aged at a fifth temperature of about 325 degrees F. for a fifth time period of about 27 hours.

The final step in the post friction stir welded treatment may involve a second air cooling of the assembly (see block 28 in FIG. 4). In one embodiment, the second air cooling step comprises cooling the assembly in ambient air (i.e., air cooled) to room temperature. In one embodiment, the second air cooling step occurs at room temperature.

Upon completion of the post friction stir welded treatment, the assembly may be installed by attaching the assembly to other assemblies, such as to form the frame of an aircraft.

That which is claimed is:

1. A method for treating alloy before and after friction stir welding, the method comprising the steps of:
   first solution heat treating a multiplicity of 7X50 alloy engineered components for a first time period at a first temperature;
   first air cooling the components in ambient air at room temperature until the components are cooled to room temperature;
   friction stir welding the components to form an assembly; and
   second solution heat treating the assembly for a second time period at a second temperature.

2. The method according to claim 1, further comprising quenching the assembly in a water bath at a third temperature after completion of the second solution heat treating step.

3. The method according to claim 2, further comprising stabilizing the assembly in ambient air at room temperature for a third time period after completion of the quenching step.

4. The method according to claim 3, further comprising first aging the assembly for a fourth time period at a fourth temperature after completion of the stabilizing step.

5. The method according to claim 4, further comprising second aging the assembly for a fifth time period at a fifth temperature after completion of the first aging step.

6. The method according to claim 5, further comprising second air cooling the assembly in ambient air at room temperature until the assembly is cooled to room temperature after the second aging step.

7. A method for treating aluminum alloy before and after friction stir welding, the method comprising the steps of:
   first solution heat treating a multiplicity of 7X50 aluminum alloy engineered components for a first time period from about 60 minutes to about 90 minutes at a first temperature from about 880 degrees F. to about 900 degrees F.;
   first air cooling the multiplicity of 7X50 aluminum alloy engineered components in ambient air at room temperature until the multiplicity of 7X50 aluminum alloy engineered components are cooled to room temperature;
   friction stir welding the multiplicity of 7X50 aluminum alloy engineered components to form an assembly;
   second solution heat treating the assembly for a second time period from about 5 minutes to about 20 minutes at a second temperature from about 880 degrees F. to about 900 degrees F.;
   quenching the assembly in a water bath at a third temperature from about 50 degrees F. to about 125 degrees F. wherein the quenching step is initialized no later than about 10 seconds after completion of the second solution heat treating step;
   stabilizing the assembly in ambient air at room temperature for a third time period of at least about 4 hours;
   first aging the assembly for a fourth time period from about 3 hours to about 6 hours at a fourth temperature from about 240 degrees F. to about 260 degrees F.; and
   second aging the assembly for a fifth time period from about 24 hours to about 30 hours at a fifth temperature from about 315 degrees F. to about 335 degrees F.

8. The method according to claim 7, wherein the multiplicity of 7X50 aluminum alloy engineered components are composed of 7050 aluminum alloy.

9. The method according to claim 7, wherein the multiplicity of 7X50 aluminum alloy engineered components have a thickness from about 0.25 inches to about 0.50 inches.

10. The method according to claim 7, wherein the multiplicity of 7X50 aluminum alloy engineered components have a thickness of about 0.25 inches.

11. The method according to claim 7, wherein the multiplicity of 7X50 aluminum alloy engineered components have a thickness of about 0.27 inches.

12. The method according to claim 7, wherein the first temperature is about 900 degrees F.

13. The method according to claim 7, wherein the first time period is about 60 minutes.

14. The method according to claim 7, wherein the friction stir welding step comprises the steps of:
   positioning a first 7X50 aluminum alloy engineered component adjacent to a second 7X50 aluminum alloy engineered component to thereby define an interface therebetween; and
   joining the first and second 7X50 aluminum alloy engineered components to form the assembly by friction stir welding the first and second 7X50 aluminum alloy engineered components along the interface.

15. The method according to claim 7, wherein the second temperature is about 900 degrees F.

16. The method according to claim 7, wherein the second time period is about 10 minutes.

17. The method according to claim 7, wherein the third time period is at least about 96 hours.

18. The method according to claim 7, wherein the fourth temperature is about 250 degrees F.

19. The method according to claim 7, wherein the fourth time period is about 5 hours.

20. The method according to claim 7, wherein the fifth temperature is about 325 degrees F.

21. The method according to claim 7, wherein the fifth time period is about 27 hours.

22. The method according to claim 7, further comprising second air cooling the assembly in ambient air at room temperature until the assembly is cooled to room temperature after the second aging step.

23. A method for treating aluminum alloy before and after friction stir welding, the method comprising the steps of:

first solution heat treating a multiplicity of 7X50 aluminum alloy engineered components having a thickness from about 0.25 inches to about 0.50 inches for a first time period of about 60 minutes at a first temperature of about 890 degrees F.;

first air cooling the multiplicity of 7X50 aluminum alloy engineered components in ambient air at room temperature until the multiplicity of 7X50 aluminum alloy engineered components are cooled to room temperature;

friction stir welding the multiplicity of 7X50 aluminum alloy engineered components to form an assembly;

second solution heat treating the assembly for a second time period of about 10 minutes at a second temperature of about 890 degrees F.;

quenching the assembly in water bath at a third temperature from about 85 degrees F. to about 100 degrees F. wherein the quenching step is initialized no later than about 10 seconds after completion of the second solution heat treating step;

stabilizing the assembly in ambient air at room temperature for a third time period of at least about 96 hours;

first aging the assembly for a fourth time period of about 5 hours at a fourth temperature of about 250 degrees F.; and second aging the assembly for a fifth time period of about 27 hours at a fifth temperature of about 325 degrees F.

24. The method according to claim 23, wherein said multiplicity of 7X50 aluminum alloy engineered components are composed of 7050 aluminum alloy.

25. The method according to claim 23, wherein the multiplicity of 7X50 aluminum alloy engineered components have a thickness of about 0.25 inches.

26. The method according to claim 23, wherein the multiplicity of 7X50 aluminum alloy engineered components have a thickness of about 0.27 inches.

27. The method according to claim 23, wherein the friction stir welding step comprises the steps of:

positioning a first 7X50 aluminum alloy engineered component adjacent to a second 7X50 aluminum alloy engineered component to thereby define an interface therebetween; and joining the first and second 7X50 aluminum alloy engineered components to form the assembly by friction stir welding the first and second 7X50 aluminum alloy engineered components along the interface.

28. The method according to claim 23, further comprising second air cooling the assembly in ambient air at room temperature until the assembly is cooled to room temperature after the second aging step.

* * * * *